US012561450B2

(12) United States Patent
Seth et al.

(10) Patent No.: US 12,561,450 B2
(45) Date of Patent: Feb. 24, 2026

(54) SYSTEMS AND METHODS FOR SECURE UNIVERSAL MEASUREMENT IDENTIFIER CONSTRUCTION

(71) Applicant: Google LLC, Mountain View, CA (US)

(72) Inventors: Karn Seth, New York, NY (US); Benjamin R. Kreuter, Jersey City, NJ (US); John Mark Richter, Boulder, CO (US); Raimundo Mirisola, Los Angeles, CA (US); Evgeny Skvortsov, Kirkland, WA (US); Craig William Wright, Louisville, KY (US); Mariana Petrova Raykova, New York, NY (US)

(73) Assignee: GOOGLE LLC, Mountain View, CA (US)

( * ) Notice: Subject to any disclaimer, the term of this patent is extended or adjusted under 35 U.S.C. 154(b) by 174 days.

(21) Appl. No.: 17/925,756

(22) PCT Filed: Jul. 9, 2021

(86) PCT No.: PCT/US2021/041125
§ 371 (c)(1),
(2) Date: Nov. 16, 2022

(87) PCT Pub. No.: WO2022/098400
PCT Pub. Date: May 12, 2022

(65) Prior Publication Data
US 2023/0177172 A1 Jun. 8, 2023

Related U.S. Application Data

(60) Provisional application No. 63/111,485, filed on Nov. 9, 2020.

(51) Int. Cl.
*G06F 21/60* (2013.01)
*H04L 9/08* (2006.01)

(52) U.S. Cl.
CPC .......... *G06F 21/602* (2013.01); *H04L 9/0819* (2013.01)

(58) Field of Classification Search
CPC . G06F 21/602; G06F 21/6245; H04L 9/0819; H04L 9/008; G06Q 2220/00; G06Q 30/02
See application file for complete search history.

(56) References Cited

U.S. PATENT DOCUMENTS

| | | | | |
|---|---|---|---|---|
| 9,641,344 B1 * | 5/2017 | Kim | ........................ | H04L 9/006 |
| 10,003,964 B1 * | 6/2018 | Blintsov | ............. | H04L 63/0428 |

(Continued)

FOREIGN PATENT DOCUMENTS

| | | |
|---|---|---|
| KR | 20100114321 | 10/2010 |
| WO | WO03007540 | 1/2003 |
| WO | WO2019098941 | 5/2019 |

OTHER PUBLICATIONS

International Search Report for Application No. PCT/US2021/041125, mailed on Oct. 13, 2021, 2 pages.

(Continued)

*Primary Examiner* — Mohammad W Reza
(74) *Attorney, Agent, or Firm* — DORITY & MANNING P.A.

(57) ABSTRACT

A method comprising receiving, at a first computing system, encrypted identifiers, performing, by the first computing system, a concealing operation on the encrypted identifiers to produce concealed encrypted identifiers, wherein the concealing operation conceals the encrypted identifiers from the first computing system and a second computing system but enables matching between the concealed encrypted identifiers, decrypting, by the second computing system, the concealed encrypted identifiers to produce concealed identifiers, analyzing, by the second computing system using one or more match rules, the concealed identifiers to generate one or more associations between the concealed identifiers, (Continued)

and generating, by the second computing system, one or more universal identifiers based on the one or more associations.

20 Claims, 7 Drawing Sheets

(56) References Cited

U.S. PATENT DOCUMENTS

| | | | |
|---|---|---|---|
| 10,320,919 | B2 | 6/2019 | Ding |
| 11,012,245 | B1 * | 5/2021 | Rivlin ................. H04L 63/0428 |
| 2015/0235275 | A1 | 8/2015 | Shah et al. |
| 2016/0078431 | A1 * | 3/2016 | Ramachandran .. G06Q 30/0605 |
| | | | 705/64 |
| 2017/0078415 | A1 | 3/2017 | Wang et al. |
| 2020/0213839 | A1 * | 7/2020 | Truchan ................ H04L 9/0869 |
| 2020/0236094 | A1 | 7/2020 | Salek et al. |
| 2021/0399873 | A1 * | 12/2021 | Duchin ................... H04L 9/006 |
| 2022/0345302 | A1 * | 10/2022 | Fukuda ................... H04L 9/008 |

OTHER PUBLICATIONS

International Preliminary Report on Patentability for Application No. PCT/US2021/041125, mailed May 19, 2023, 8 pages.

* cited by examiner

600

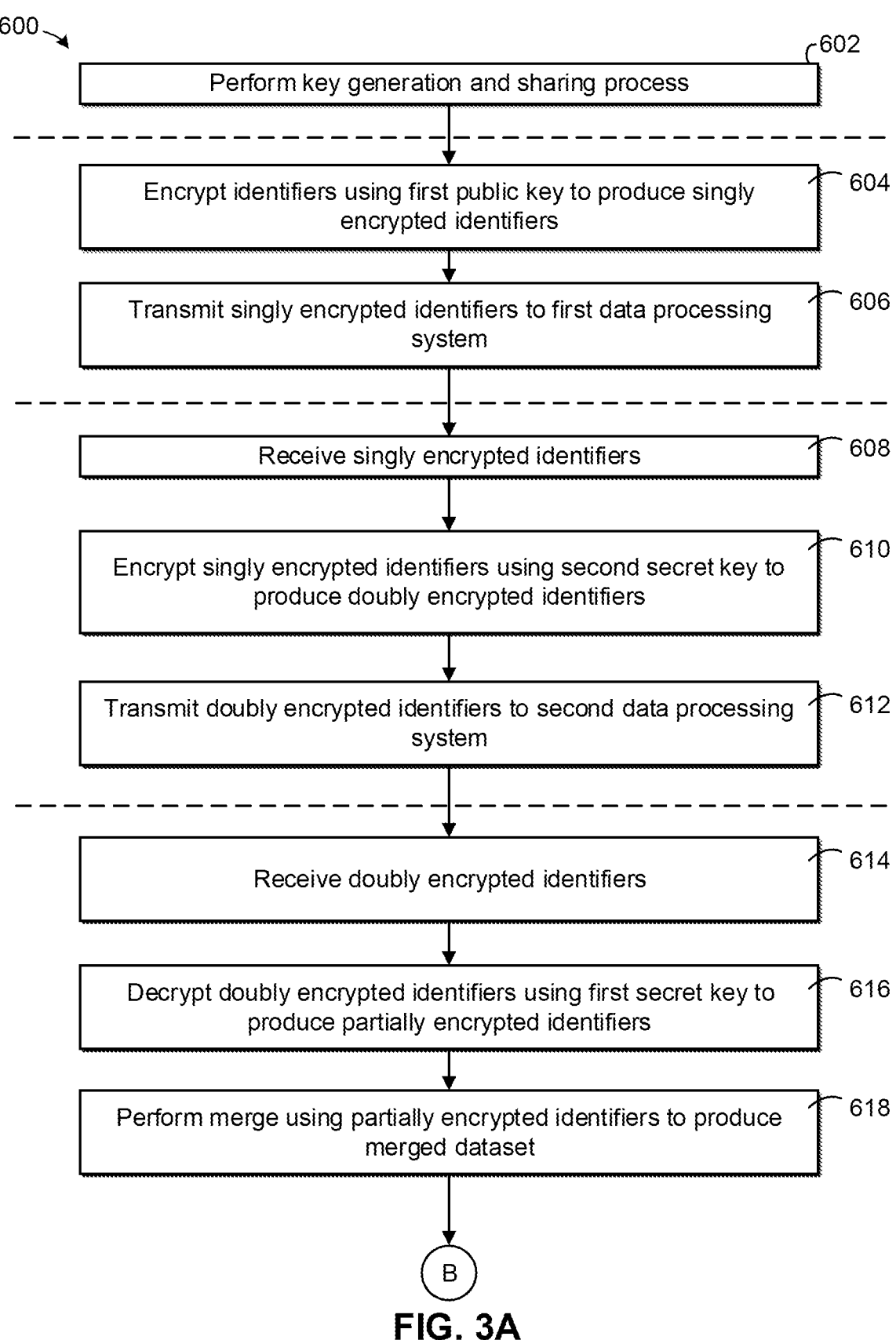

602
Perform key generation and sharing process

604
Encrypt identifiers using first public key to produce singly encrypted identifiers 606
Transmit singly encrypted identifiers to first data processing system 608
Receive singly encrypted identifiers 610
Encrypt singly encrypted identifiers using second secret key to produce doubly encrypted identifiers 612
Transmit doubly encrypted identifiers to second data processing system 614
Receive doubly encrypted identifiers 616
Decrypt doubly encrypted identifiers using first secret key to produce partially encrypted identifiers 618
Perform merge using partially encrypted identifiers to produce merged dataset

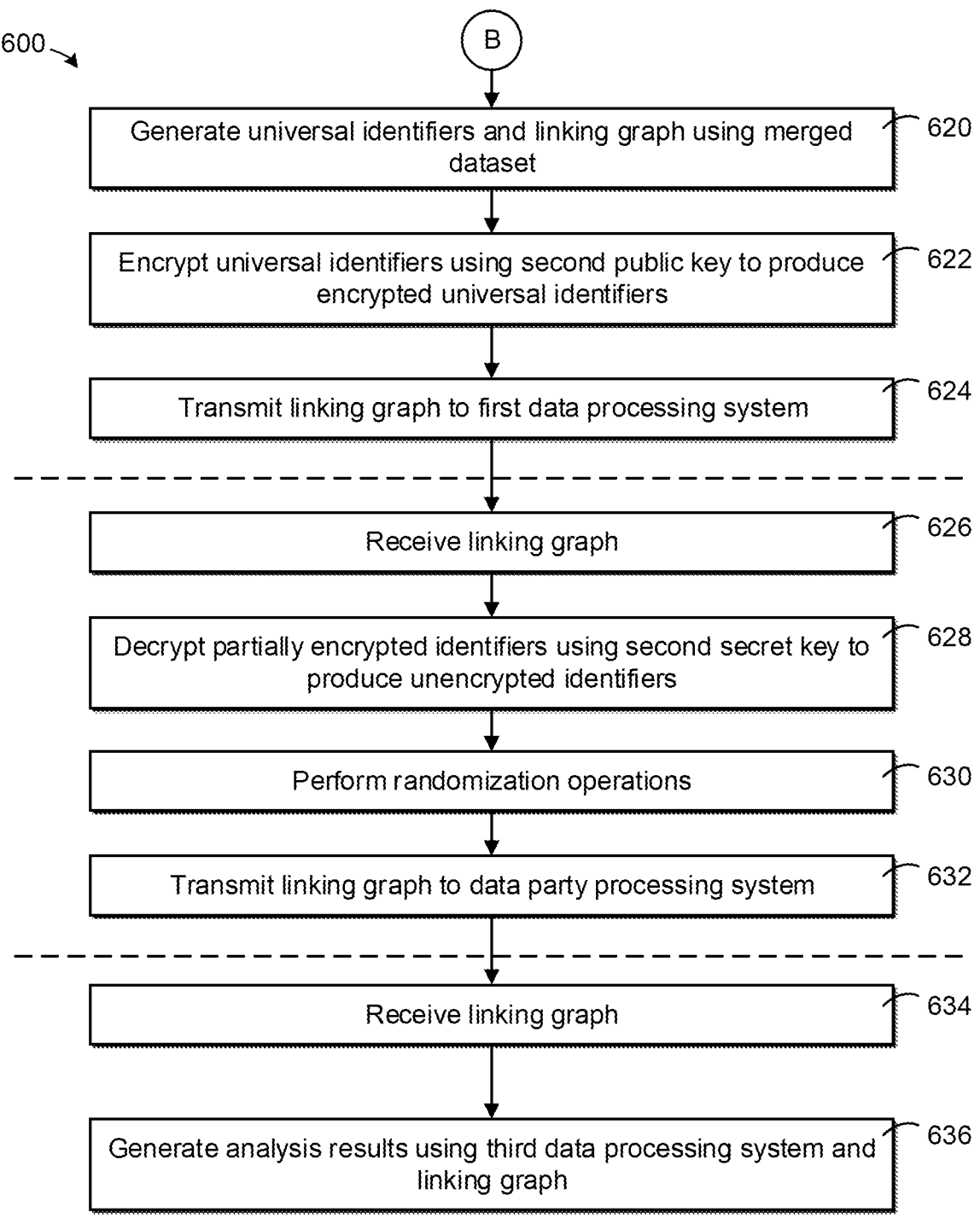

600

B

Generate universal identifiers and linking graph using merged dataset — 620

Encrypt universal identifiers using second public key to produce encrypted universal identifiers — 622

Transmit linking graph to first data processing system — 624

Receive linking graph — 626

Decrypt partially encrypted identifiers using second secret key to produce unencrypted identifiers — 628

Perform randomization operations — 630

Transmit linking graph to data party processing system — 632

Receive linking graph — 634

Generate analysis results using third data processing system and linking graph — 636

FIG. 3B

SYSTEMS AND METHODS FOR SECURE UNIVERSAL MEASUREMENT IDENTIFIER CONSTRUCTION

CROSS-REFERENCE TO RELATED PATENT APPLICATIONS

This application is based upon and claims the right of priority under 35 U.S.C. § 371 to International Application No. PCT/US2021/041125 filed on Jul. 9, 2021, which claims the benefit and priority of U.S. Provisional Patent Application No. 63/111,485 filed on Nov. 9, 2020. Applicant claims priority to and the benefit of each of such applications and incorporate all such applications herein by reference in its entirety.

BACKGROUND

It can be helpful for analytics systems to be able to determine aggregated information about interactions with content, such as how many devices interacted with a particular item of content. However, there is often an interest in maintaining the privacy of information. For example, an entity may be interested in receiving information about how many devices a particular type of content reached or how many devices interacted in a particular way with the content without receiving information that could identify a source of the information, such as an identifier associated with the devices.

SUMMARY

One implementation of the disclosure relates to a method comprising receiving, at a first computing system, encrypted identifiers, performing, by the first computing system, a concealing operation on the encrypted identifiers to produce concealed encrypted identifiers, wherein the concealing operation conceals the encrypted identifiers from the first computing system and a second computing system but enables matching between the concealed encrypted identifiers, decrypting, by the second computing system, the concealed encrypted identifiers to produce concealed identifiers, analyzing, by the second computing system using one or more match rules, the concealed identifiers to generate one or more associations between the concealed identifiers, and generating, by the second computing system, one or more universal identifiers based on the one or more associations.

In some implementations, performing the concealing operation includes deterministically encrypting the encrypted identifiers with second encryption to produce the concealed encrypted identifiers. In some implementations, the concealing operation includes shuffling the encrypted identifiers. In some implementations, analyzing the concealed identifiers includes matching one or more of the concealed identifiers to generate the one or more associations, scoring the one or more associations using the one or more match rules, and pruning the one or more associations based on the scoring. In some implementations, scoring the one or more associations includes determining a source of the one or more concealed identifiers associated with the one or more associations, performing a lookup of the one or more match rules using the source, and assigning a score to the one or more associations based on the lookup. In some implementations, the method further comprises analyzing, by the second computing system using one or more different match rules, the concealed identifiers to generate a second set of one or more associations, and selecting, by the second computing system, between the one or more associations generated using the one or more different match rules and the one or more associations generated using the one or more match rules. In some implementations, the method further comprises determining a quality of the one or more associations, and iteratively adjusting the one or more match rules based on the determined quality. In some implementations, the method further comprises analyzing, by the second computing system using the one or more match rules, identifiers having known associations to generate one or more test associations, comparing the known associations to the one or more test associations, and updating the one or more match rules based on the comparison. In some implementations, at least one of the first computing system or the second computing system is a distributed computing system.

Another implementation of the present disclosure relates to a system for constructing a universal identifier comprising a first computing system configured to receive encrypted identifiers and perform a concealing operation on the encrypted identifiers to produce concealed encrypted identifiers, wherein the concealing operation conceals the encrypted identifiers from the first computing system and a second computing system but enables matching between the concealed encrypted identifiers, and the second computing system configured to decrypt the concealed encrypted identifiers to produce concealed identifiers, analyze, using one or more match rules, the concealed identifiers to generate one or more associations between the concealed identifiers, and generate one or more universal identifiers based on the one or more associations.

In some implementations, performing the concealing operation includes deterministically encrypting the encrypted identifiers with second encryption to produce the concealed encrypted identifiers. In some implementations, the concealing operation includes shuffling the encrypted identifiers. In some implementations, analyzing the concealed identifiers includes matching one or more of the concealed identifiers to generate the one or more associations, scoring the one or more associations using the one or more match rules, and pruning the one or more associations based on the scoring. In some implementations, scoring the one or more associations includes determining a source of the one or more concealed identifiers associated with the one or more associations, performing a lookup of the one or more match rules using the source, and assigning a score to the one or more associations based on the lookup. In some implementations, the second computing system is further configured to analyze, using one or more different match rules, the concealed identifiers to generate a second set of one or more associations and select between the one or more associations generated using the one or more different match rules and the one or more associations generated using the one or more match rules. In some implementations, the second computing system is further configured to determine a quality of the one or more associations and iteratively adjust the one or more match rules based on the determined quality. In some implementations, the second computing system is further configured to analyze, using the one or more match rules, identifiers having known associations to generate one or more test associations, compare the known associations to the one or more test associations, and update the one or more match rules based on the comparison. In some implementations, at least one of the first computing system or the second computing system is a distributed computing system.

Another implementation of the present disclosure relates to one or more non-transitory computer-readable storage media having instructions stored thereon that, when executed by the one or more processors, cause the one or more processors to receive, from a first computing system, concealed encrypted identifiers having encrypted identifiers that are concealed from the first computing system and the one or more processors but enable matching between the concealed encrypted identifiers, decrypt the concealed encrypted identifiers to produce concealed identifiers, analyze, using one or more match rules, the concealed identifiers to generate one or more associations between the concealed identifiers, and generate one or more universal identifiers based on the one or more associations.

In some implementations, analyzing the concealed identifiers includes matching one or more of the concealed identifiers to generate the one or more associations, scoring the one or more associations using the one or more match rules, and pruning the one or more associations based on the scoring.

The various aspects and implementations may be combined where appropriate.

BRIEF DESCRIPTION OF THE DRAWINGS

FIGS. 3A-3B are a flow diagram illustrating a method of secure universal identifier construction and analysis, according to an illustrative implementation.

DETAILED DESCRIPTION

Figure 1A:
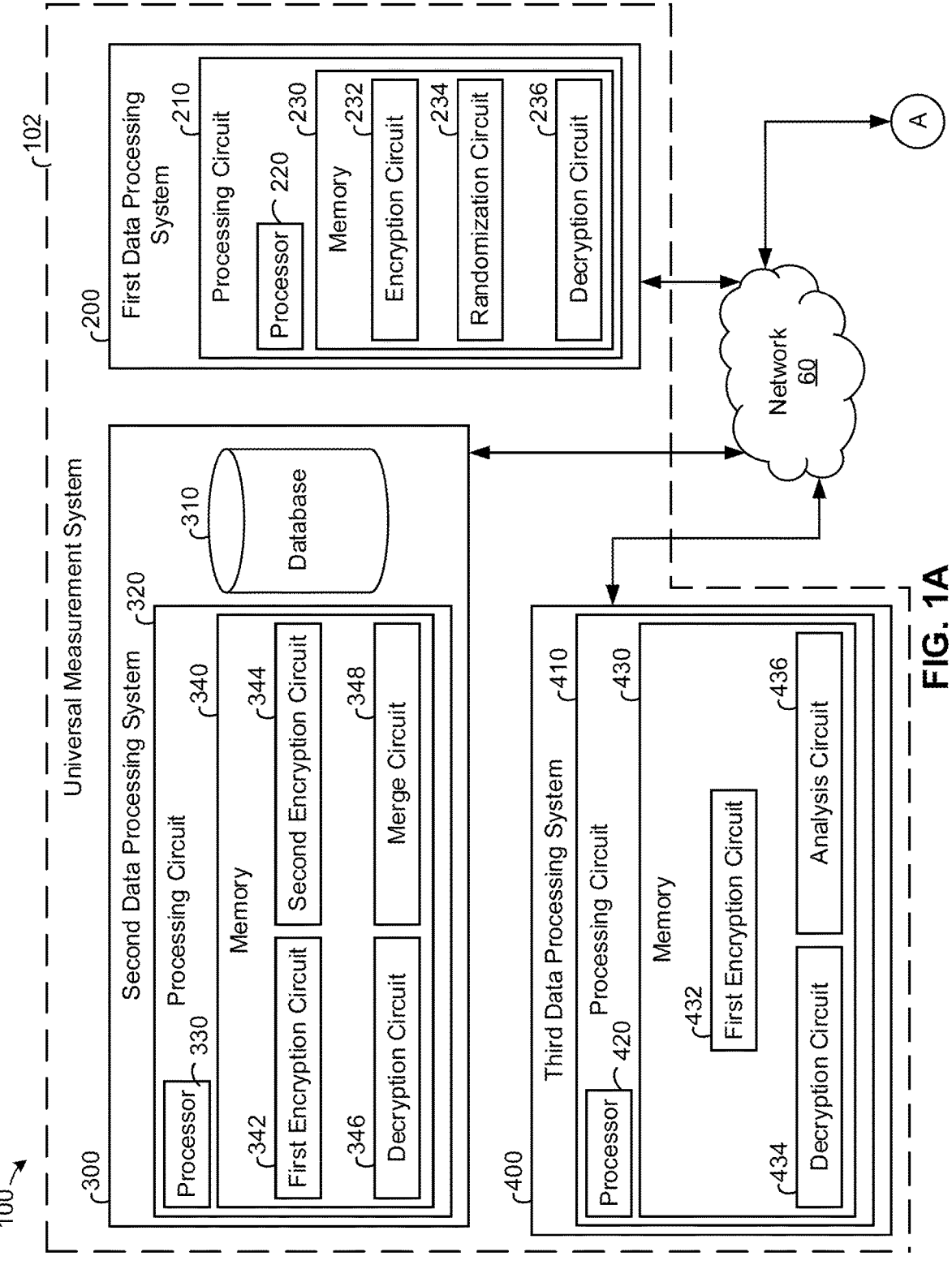
FIGS. 1A-1B are a diagram illustrating various entities interacting over a network, according to an illustrative implementation.

Following below are more detailed descriptions of various concepts related to, and implementations of, methods, apparatuses, and systems for secure universal measurement identifier construction. The various concepts introduced above and discussed in greater detail below may be implemented in any of numerous ways, as the described concepts are not limited to any particular manner of implementation.

In many domains, it may be necessary or desirable to determine an aggregate number of interactions attributed to content. For example, a number of content publishers may display a number of content items that a user views before performing an online interaction, and it may be desirable to determine the number of online interactions associated with the displayed number of content items (e.g., how many online interactions were generated by users that viewed a particular content item before performing the online interaction). In various implementations, online interactions may be associated with various identifiers. For example, a device having a first identifier may complete a first interaction with a first publisher and the device may complete a second interaction with a second publisher using a second identifier. In various implementations, determining the aggregate number of interactions attributed to content includes determining that the second interaction associated with the second identifier was performed by the same device as the first interaction associated with the first identifier.

System and methods of the present disclosure relate generally to determining associations between disparate identifiers, thereby facilitating determining the aggregate number of interactions attributed to content. More specifically, systems and methods of the present disclosure relate to unique cryptography and computer architecture methodologies to securely aggregate identifiers from different data parties (e.g., data providers, etc.), determine associations between the identifiers, and generate universal measurement identifiers that reflect the determined associations between the identifiers in a more secure way. Typically, aggregating data from different entities requires a computing system to have access to user specific data. For example, a system may determine an aggregate count by summing values having matching user identifiers. To avoid revealing personal information, the identity of the user must be hidden and suitably protected when generating and reporting the data.

It is desirable to conduct certain analysis activities in a manner that protects against the exposure of personal information. Therefore, there is a need for a unique cryptography and computer architecture methodology to aggregate identifiers from different entities in a more secure way. Aspects of the present disclosure provide improved encryption methods and computer architectures. The encryption methods and architectures may be used to correlate online interactions with data from content publishers in a secure way, while providing increased security and also conserving user privacy.

To ensure the privacy and security of personal information, systems and methods of the present disclosure process data to prevent entities (e.g., a content provider, a third party, etc.) from receiving personal information. A non-limiting example implementation is as follows: a second data processing system may produce a first public key for asymmetric encryption. A first data party computing system may encrypt first identifiers using the first public key and a second data party computing system may encrypt second identifiers using the first public key. A first data processing system may receive, from a number of data party computing systems (e.g., publishers, etc.), a number of encrypted identifiers. The first data processing system may generate a secret key for elliptic curve encryption and may encrypt the encrypted first and second identifiers with the secret key to produce double-encrypted first and second identifiers. The first data processing system may send the double-encrypted first and second identifiers to the second data processing system which may decrypt the double-encrypted first and second identifiers to produce elliptic curve (EC) encrypted first and second identifiers. The second data processing system may analyze the EC encrypted first and second identifiers to identify associations between the EC encrypted first and second identifiers (e.g., a first identifier corresponds to the same device as a second identifier, etc.). The second data processing system may generate universal measurement identifiers and associate the universal measurement identifiers with one or more of the EC encrypted first and second identifiers. The second data processing system may encrypt the universal measurement identifiers with a public key received from a third data processing system and may transmit the encrypted universal measurement identifiers and the EC encrypted first and second identifiers to the first data processing system. The first data processing system may decrypt the EC encrypted first and second identifiers and transmit the unencrypted first identifier and the encrypted universal measurement identifiers to the first data party computing system and may transmit the unencrypted second identifier and the encrypted universal measurement identifiers to the second data party computing system. The first and second data party computing systems may transmit the encrypted universal measurement identifiers to the third data processing system which may decrypt the encrypted universal measurement identifiers and use the unencrypted universal measurement identifier to determine aggregate statistics. Therefore, the universal measurement system (e.g., first, second, and third data processing systems, etc.) may facilitate aggregation of identifiers without revealing personal information.

In some implementations of the present disclosure, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personal information, or only certain personal information, can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Figure 1B:
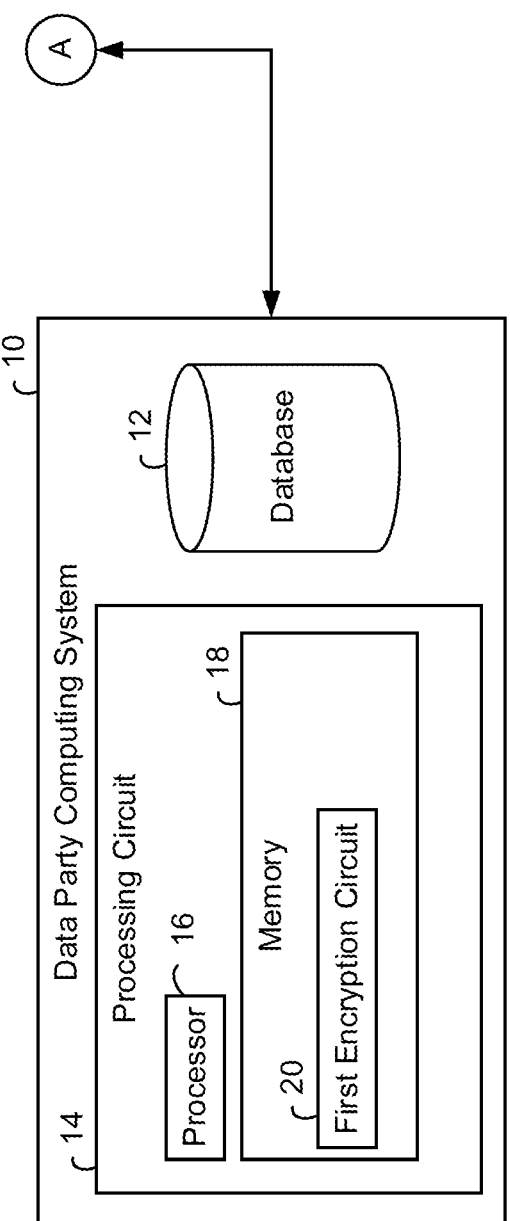

Referring now to FIGS. 1A-1B, system 100 for securely generating universal measurement identifiers is shown, according to an illustrative implementation. System 100 includes universal measurement system 102 and data party computing system 10. In various implementations, universal measurement system 102 includes first data processing system 200, second data processing system 300, and third data processing system 400. In various implementations, components of system 100 communicate over network 60. Network 60 may include computer networks such as the Internet, local, wide, metro or other area networks, intranets, satellite networks, other computer networks such as voice or data mobile phone communication networks, combinations thereof, or any other type of electronic communications network. Network 60 may include or constitute a display network (e.g., a subset of information resources available on the Internet that are associated with a content placement or search engine results system, or that are eligible to include third party content items as part of a content item placement campaign). In various implementations, network 60 facilitates secure communication between components of system 100. As a non-limiting example, network 60 may implement transport layer security (TLS), secure sockets layer (SSL), hypertext transfer protocol secure (HTTPS), and/or any other secure communication protocol.

Data party computing system 10 may host data such as identifiers. In various implementations, data party computing system 10 is associated with a publisher (e.g., an online publisher, etc.). In various implementations, the data is associated with user interactions with content. For example, the data may include device identifiers and data describing interactions associated with the device identifiers such as timestamps associated interactions with online content. In some implementations, the data includes classifications. For example, the data may include a number of identifiers each associated with an identifier type (e.g., email address, phone number, device identifier, account identifier, etc.). In various implementations, system 100 may include a number of data party computing systems 10. For example, system 100 may receive identifiers from ten data party computing systems 10 and determine associations between the identifiers provided by the ten data party computing systems 10.

Data party computing system 10 may include database 12 and processing circuit 14. Database 12 may store data such as identifiers. For example, database 12 may store account identifiers associated with accounts registered on a website. As another example, database 12 may store an account identifier and an email address and/or phone number associated with the account identifier. In some implementations, there is overlap between identifiers stored by different data party computing systems 10. For example, a first data party computing system 10 may store a number of identifiers that at least partially overlap with a number of identifiers stored by a second data party computing system 10 (e.g., include the same identifiers, etc.). In some implementations, database 12 stores interaction data. The interaction data may be used later for generating aggregate interaction statistics. Database 12 may include one or more storage mediums. The storage mediums may include but are not limited to magnetic storage, optical storage, flash storage, and/or RAM. Data party computing system 10 may implement or facilitate various APIs to perform database functions (i.e., managing data stored in database 12). The APIs can be but are not limited to SQL, ODBC, JDBC, and/or any other data storage and manipulation API.

Processing circuit 14 includes processor 16 and memory 18. Memory 18 may have instructions stored thereon that, when executed by processor 16, cause processing circuit 14 to perform the various operations described herein. The operations described herein may be implemented using software, hardware, or a combination thereof. Processor 16 may include a microprocessor, ASIC, FPGA, etc., or combinations thereof. In many implementations, processor 16 may be a multi-core processor or an array of processors. Processor 16 may implement or facilitate secure environments. For example, processor 16 may implement software guard extensions (SGX) to define private regions (e.g., enclaves) in memory 18. Memory 18 may include, but is not limited to, electronic, optical, magnetic, or any other storage devices capable of providing processor 16 with program instructions. Memory 18 may include a floppy disk, CD-ROM, DVD, magnetic disk, memory chip, ROM, RAM, EEPROM, EPROM, flash memory, optical media, or any other suitable memory from which processor 16 can read instructions. The instructions may include code from any suitable computer programming language such as, but not limited to, C, C++, C#, Java, JavaScript, Perl, HTML, XML, Python and Visual Basic.

Memory 18 may include first encryption circuit 20. In the illustrated implementation, first encryption circuit 20 may be implemented using computer or machine-readable instructions stored within memory 18. In other implementations, first encryption circuit 20 may be a discrete hardware circuit or may be implemented using a combination of hardware and software. First encryption circuit 20 may implement one or more encryption functions on input data to produce encrypted data. In some implementations, first encryption circuit 20 implements an asymmetric encryption function. In various implementations, first encryption circuit 20 implements an ElGamal (EG) encryption protocol. For example, first encryption circuit 20 may encrypt identifiers with an EG public key received from second data processing system 300. In various implementations, first encryption circuit 20 implements commutative encryption. For example, first encryption circuit 20 may implement EG encryption that facilitates double-encrypted values (e.g., a single value encrypted with two different encryption schemes). In various implementations, first encryption circuit facilitates randomized encryption. For example, first encryption circuit 20 may encrypt a first value using a first key to produce a first encrypted result and may encrypt the first value again using the first key to produce a second encrypted result that is different than the first encrypted result (e.g., produces different ciphertexts). In various implementations, first encryption circuit 20 facilitates rerandomization.

Referring now specifically to FIG. 1A, first data processing system 200 may facilitate processing of external data (e.g., data party data, etc.). In various implementations, first data processing system 200 receives data and processes the data to produce processed data (e.g., data without or with less personal information, etc.). In some implementations, first data processing system 200 produces differentially-private data. In some implementations, first data processing system 200 generates encryption keys. For example, first data processing system 200 may generate an elliptic curve (EC) private key. Additionally or alternatively, first data processing system 200 may collaboratively generate an EG public key with one or more other systems (e.g., duplicate first data processing systems 200, etc.). First data processing system 200 may be a server, distributed processing cluster, cloud processing system, or any other computing device. First data processing system 200 may include or execute at least one computer program or at least one script. In some implementations, first data processing system 200 includes combinations of software and hardware, such as one or more processors configured to execute one or more scripts.

First data processing system 200 is shown to include processing circuit 210. Processing circuit 210 includes processor 220 and memory 230. Memory 230 may have instructions stored thereon that, when executed by processor 220, cause processing circuit 210 to perform the various operations described herein. Processing circuit 210, processor 220, and/or memory 230 may be similar to processing circuit 14, processor 16, and/or memory 18 as described above. Memory 230 may include encryption circuit 232, randomization circuit 234, and decryption circuit 236.

Encryption circuit 232 may implement one or more encryption functions on input data to produce encrypted data. In some implementations, encryption circuit 232 implements a symmetric encryption function (e.g., EC, etc.). In some implementations, encryption circuit 232 implements EC encryption over an elliptic curve. For example, encryption circuit 232 may implement Elliptic Curve (EC) encryption over an elliptic curve collaboratively generated using a number of other systems (e.g., duplicates of first data processing system 200, etc.). Additionally or alternatively, encryption circuit 232 may implement any cryptosystem where the Decisional Diffie-Hellman (DDH) problem is presumed to be computationally intractable, such that the multiplicative group of quadratic residues modulo a safe prime number. In various implementations, encryption circuit 232 generates one or more encryption keys. For example, encryption circuit 232 may generate a secret key (e.g., also referred to as a private key). In various implementations, encryption circuit 232 facilitates various cryptographic functions (e.g., commutativity, rerandomization, etc.) as described in reference to first encryption circuit 20.

In various implementations, encryption circuit 232 encrypts identifiers with an EC secret key. In various implementations, encryption circuit 232 implements deterministic encryption. For example, encryption circuit 232 may encrypt a first value with a first key to produce a first encrypted result and may encrypt the first value again with the first key to produce a second encrypted result that is the same as the first encrypted result. In various implementations, encryption circuit 232 facilitates generating encrypted data that may be compared for equality (e.g., compare two values encrypted with the same key, etc.). In some implementations, encryption circuit 232 facilitates collaborative encryption. For example, a number of encryption circuits 232 may work together to encrypt a data item (e.g., each adding a portion of encryption, etc.). As another example, a number of encryption circuits 232 (e.g., each associated with a different first data processing system 200, etc.) may work together to perform joint-key EG encryption (e.g., threshold encryption, etc.). Encryption schemes are discussed in detail with reference to P.C.T. Application No. US2019/064383 filed on Dec. 4, 2019, the entire disclosure of which is incorporated by reference herein.

Randomization circuit 234 may receive data and perform various randomization functions to produce randomized data. As a non-limiting example, randomization circuit 234 may facilitate removing implicit/indirect identifiers (e.g., arrival time, order, originating IP address, etc.), performing batching operations, introducing noise, and/or performing any other anonymizing operation. In various implementations, randomization circuit 234 shuffles (e.g., rearranges, changes an order of, etc.) received data to produce shuffled data. In some implementations, randomization circuit 234 implements one or more hashing functions on input data to produce hashed data. For example, randomization circuit 234 may implement SHA-2, Scrypt, Balloon, and/or Argon2 hashing functions. In some implementations, randomization circuit 234 facilitates rerandomizing ciphertexts by applying subsequent rounds of encryption. For example, randomization circuit 234 may rerandomize an EG encrypted value by encrypting the EG encrypted value a second time with the same key used to encrypt the EG encrypted value the first time.

Decryption circuit 236 may receive encrypted data and decrypt it to produce unencrypted data. In various implementations, decryption circuit 236 receives encrypted data from second data processing system 300. For example, decryption circuit 236 may receive encrypted identifiers from second data processing system 300. Decryption circuit 236 may decrypt symmetrically encrypted data. Additionally or alternatively, decryption circuit 236 may decrypt symmetric and/or threshold encrypted data. In various implementations, decryption circuit 236 decrypts data using one or more secrets (e.g., a secret key, etc.). For example, decryption circuit 236 may decrypt encrypted identifiers using a secret key used to encrypt data by encryption circuit 232. In various implementations, decryption circuit 236 decrypts EC encryption. In some implementations, decryption circuit 236 collaboratively decrypts encryption such as through a threshold decryption scheme.

Second data processing system 300 may facilitate securely analyzing identifiers from different entities. For example, second data processing system 300 may receive a number of identifiers from different entities, may compare the number of identifiers to determine any associations between the number of identifiers, and may generate one or more universal measurement identifiers based on the determined associations. In various implementations, second data processing system 300 receives encrypted identifiers and processes the received data to generate results (e.g., a linking graph, universal measurement identifiers, etc.). For example, second data processing system 300 may perform a merging operation to join device identifiers and assign universal measurement identifiers to the joined identifiers. Second data processing system 300 may include or execute at least one computer program or at least one script. In some implementations, second data processing system 300 includes combinations of software and hardware, such as one or more processors configured to execute one or more scripts.

Second data processing system 300 is shown to include database 310 and processing circuit 320. Database 310 may store data such as identifiers. For example, database 310 may store identifiers received from various external sources (e.g., data party computing system 10, etc.). In various implementations, database 310 stores context data associated with identifiers. For example, database 310 may store data describing a source of each identifier (e.g., which external source provided the identifier, etc.). As another example, database 310 may store data describing a type of each identifier (e.g., an email address, a phone number, an account number, etc.). In some implementations, database 310 stores derived data. For example, database 310 may store a linking graph generated by second data processing system 300. Database 310 may include one or more storage mediums. The storage mediums may include but are not limited to magnetic storage, optical storage, flash storage, and/or RAM. Second data processing system 300 may implement or facilitate various APIs to perform database functions (i.e., managing data stored in database 310). The APIs can be but are not limited to SQL, ODBC, JDBC, and/or any other data storage and manipulation API.

Processing circuit 320 is shown to include processor 330 and memory 340. Memory 340 may have instructions stored thereon that, when executed by processor 330, cause processing circuit 310 to perform the various operations described herein. Memory 340 may include first encryption circuit 342, second encryption circuit 344, decryption circuit 346, and merge circuit 348.

First encryption circuit 342 may implement one or more encryption functions on input data to produce encrypted data. In some implementations, first encryption circuit 342 implements an asymmetric encryption function (e.g., EG, etc.). In some implementations, first encryption circuit 342 implements EG encryption over an elliptic curve. In various implementations, first encryption circuit 342 is similar to first encryption circuit 20. In some implementations, first encryption circuit 342 generates encryption keys. For example, first encryption circuit 342 may generate a public key (e.g., an EG public key) and a secret key (e.g., an EG secret key). In some implementations, first encryption circuit 342 collaboratively generates an EG public key with other systems. In some implementations, first encryption circuit 342 shares the encryption keys (or a portion thereof) with other components of system 100 (e.g., data party computing system 10, etc.). In various implementations, first encryption circuit 342 facilitates various cryptographic functions (e.g., commutativity, rerandomization, etc.) as described in reference to randomization circuit 234.

Second encryption circuit 344 may implement one or more encryption functions on input data to produce encrypted data. In some implementations, second encryption circuit 344 implements an asymmetric encryption function. For example, second encryption circuit 344 may implement a Rivest-Shamir-Adleman (RSA) cryptosystem. As an additional example, second encryption circuit 344 may perform encryption using a public key received from third data processing system 400. In some implementations, second encryption circuit 344 implements EG encryption using an EG public key received from third data processing system 400.

Decryption circuit 346 may receive encrypted data and decrypt it to produce unencrypted data. In various implementations, decryption circuit 346 receives encrypted data from first data processing system 200. For example, decryption circuit 346 may receive encrypted identifiers from first data processing system 200. Decryption circuit 346 may decrypt asymmetrically encrypted data. Additionally or alternatively, decryption circuit 346 may decrypt symmetric and/or threshold encrypted data. In various implementations, decryption circuit 346 decrypts double encrypted identifiers received from first data processing system 200 using an EG secret key generated by first encryption circuit 342 to produce EC encrypted identifiers. In various implementations, the EC encrypted identifiers may be compared for equality.

Merge circuit 348 may receive anonymous (e.g., encrypted, etc.) data and produce output data (e.g., one or more universal measurement identifiers, a linking graph, etc.). In various implementations, merge circuit 348 performs statistical operations on received data to determine associations between elements of the data. For example, merge circuit 348 may determine a number of identifiers originating from different external data parties are associated with the same device. In various implementations, merge circuit 348 facilitates joining identifiers. For example, merge circuit 348 may join first identifiers from a first platform with second identifiers from a second platform. In various implementations, merge circuit 348 facilitates joining encrypted identifiers, thereby preserving user privacy. In various implementations, merge circuit 348 implements one or more rules (e.g., match rules, etc.). For example, merge circuit 348 may implement one or more match rules to determine associations between disparate identifiers and generate universal measurement identifiers. As another example, merge circuit 348 may implement one or more match rules to generate a linking graph describing associations between disparate identifiers (e.g., a first identifier is associated with a second identifier through a third identifier, etc.). Match rules are described in greater detail with reference to FIG. 4 below.

Third data processing system 400 may facilitate determining aggregate statistics associated with data. For example, third data processing system 400 may receive interaction data and encrypted universal measurement identifiers from data party computing system 10 and generate aggregate statics including reach, frequency, sales lift, multi-touch attribution (MTA), and/or the like. In various implementations, third data processing system 400 generates aggregate statistics using universal measurement identifiers. Third data processing system 400 may include or execute at least one computer program or at least one script. In some implementations, third data processing system 400 includes combinations of software and hardware, such as one or more processors configured to execute one or more scripts.

Third data processing system 400 is shown to include processing circuit 410 having processor 420 and memory 430. Memory 430 may have instructions stored thereon that, when executed by processor 420, cause processing circuit 410 to perform the various operations described herein. Memory 430 may include first encryption circuit 432, decryption circuit 434, and analysis circuit 436.

First encryption circuit 432 may implement one or more encryption functions on input data to produce encrypted data. In some implementations, first encryption circuit 432 implements an asymmetric encryption function (e.g., EG, AHE, etc.). In some implementations, first encryption circuit 432 generates encryption keys. For example, first encryption circuit 432 may generate a public key (e.g., an AHE public key) and a secret key (e.g., an AHE secret key). In some implementations, first encryption circuit 432 shares the encryption keys with other components of system 100 (e.g., second data processing system 300, etc.). In various implementations, first encryption circuit 432 facilitates various cryptographic functions (e.g., additivity, scalar multiplication, etc.).

Decryption circuit 434 may receive encrypted data and decrypt it to produce unencrypted data. In various implementations, decryption circuit 434 receives encrypted data from data party computing system 10. For example, decryption circuit 434 may receive encrypted universal measurement identifiers from data party computing system 10. Decryption circuit 434 may decrypt asymmetrically encrypted data. Additionally or alternatively, decryption circuit 434 may decrypt symmetric and/or threshold encrypted data. In some implementations, decryption circuit 434 facilitates collaborative decryption. For example, a number of decryption circuits 434 may work together to decrypt an encrypted data item (e.g., each removing a portion of encryption, etc.).

Analysis circuit 436 may analyze data and generate output data. In various implementations, analysis circuit 436 analyzes interaction data to generate aggregate statistics associated with online interactions. For example, analysis circuit 436 may receive data describing a number of online interactions and may use one or more universal measurement identifiers to determine associations between various online interactions. In some implementations, analysis circuit 436 generates aggregate statistics such as reach, frequency, sales lift, and/or MTA associated with interaction data.

Figure 2:
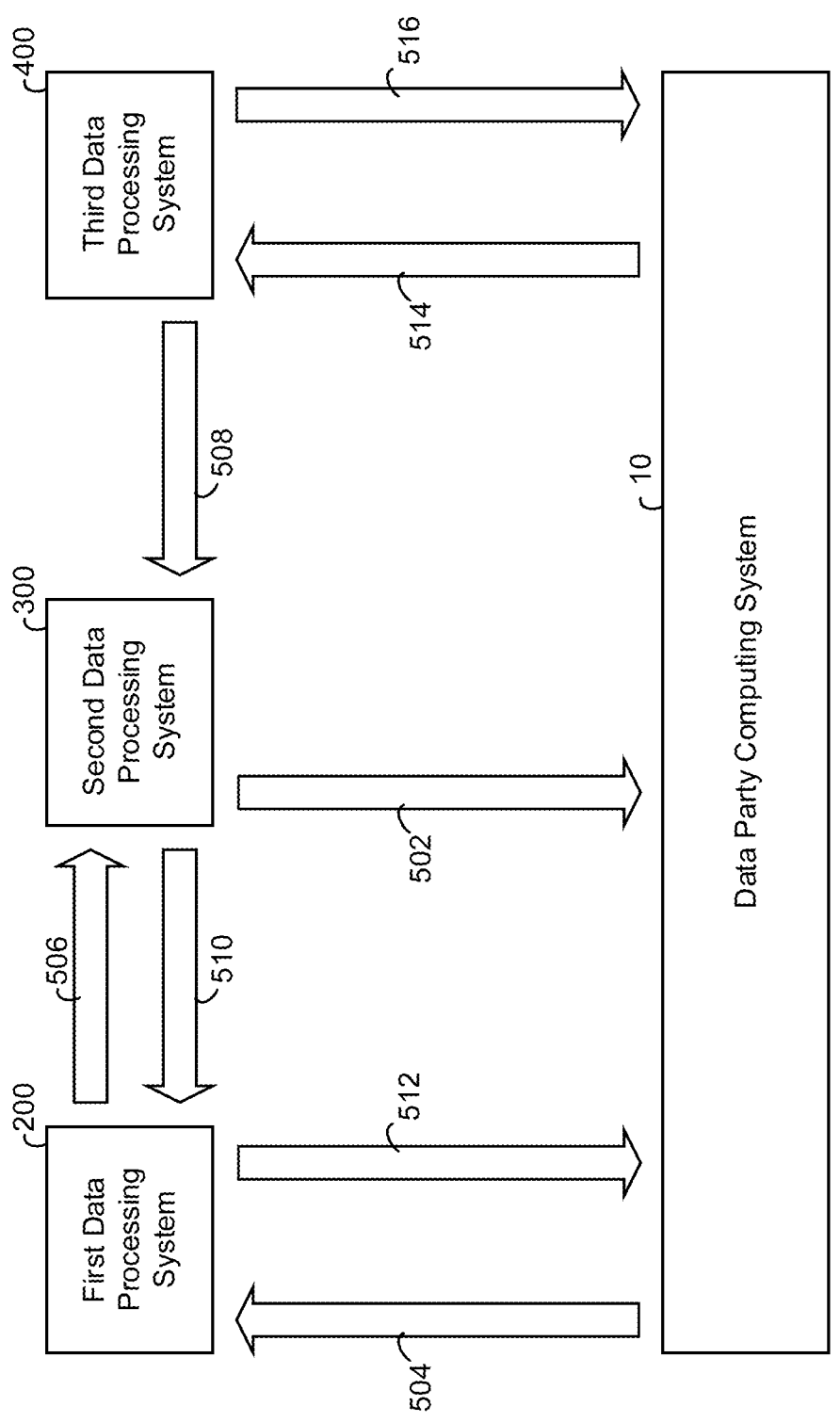
FIG. 2 is a diagram illustrating data transfer between the various entities of FIGS. 1A-1B, according to an implementation.

Referring now to FIG. 2, an improved computer architecture for securely associating identifiers from different sources and generating universal measurement identifiers is shown, according to an illustrative implementation. In brief summary, various external data providers (e.g., data party computing system 10, etc.) may provide identifiers and first data processing system 200, second data processing system 300, and/or third data processing system 400 may collaboratively determine associations between the identifiers and generate universal measurement identifiers and/or other data (e.g., a linking graph, aggregate statistics, etc.). For example, second data processing system 300 may determine that a first identifier (e.g., an account number, etc.) is associated with a second and third identifier (e.g., an email address and phone number, respectively, etc.).

In various implementations, external data providers such as content providers and/or content publishers may wish to know when users interact with content. For example, a user shown a video may click on the video and a publisher that provided the video may wish to know how many users clicked on the video. In some implementations, users interact with other content provided by a publisher as a result of their interaction with content items. For example, a user shown a video may later visit a website maintained by the publisher to purchase an item featured in the video. In some implementations, the interaction is or is associated with an online conversion. In various implementations, measuring interactions with content items requires keeping track of disparate identifiers across platforms. For example, a device may interact with a first content item on a first platform using a first identifier and may interact with a second content item on a second platform using a second identifier and a content provider may wish to link the first interaction with the second interaction, thereby requiring that the first identifier be identified as associated with (e.g., belonging to, etc.) the same device as the second identifier. Therefore, there is a need for a system to securely and anonymously aggregate identifiers and determine associations between identifiers without revealing personal information. A novel cryptography and computer architecture as described herein facilitates secure and anonymous generation of universal measurement identifiers without revealing personal information.

At step 502, second data processing system 300 may transmit an EG public key to data party computing system 10. In various implementations, step 502 includes transmitting the EG public key to a number of data party computing systems 10 and/or other external systems. In some implementations, the EG public key is an EG public key generated by implementing EG encryption over an elliptic curve.

At step 504, data party computing system 10 transmits encrypted identifiers to first data processing system 200. In various implementations, the encrypted identifiers are encrypted (e.g., by data party computing system 10, etc.) using the EG public key received from second data processing system 300. In various implementations, the encrypted identifiers include context data. For example, the encrypted identifiers may include data describing a source of the encrypted identifiers (e.g., which data party the encrypted identifiers originated from, etc.) and/or data describing a type of the encrypted identifiers (e.g., an email address, a phone number, etc.). In some implementations, at least a portion of the context data is encrypted (e.g., using the EG public key, etc.). In some implementations, the context data describes associations between the encrypted identifiers. For example, the context data may describe that a first encrypted identifier (e.g., a device identifier) is associated with a second encrypted identifier (e.g., an account number, etc.). In various implementations, first data processing system 200 encrypts the encrypted identifiers to produce double encrypted identifiers. In various implementations, first data processing system 200 encrypts the encrypted identifiers using an EC private key. In various implementations, first data processing system 200 performs randomization operations on the received data. For example, first data processing system 200 may shuffle the encrypted identifiers (e.g., rearrange rows within a table, etc.).

At step 506, first data processing system 200 transmits the double encrypted identifiers to second data processing system 300. Second data processing system 300 may decrypt the double encrypted identifiers to produce EC encrypted identifiers. In various implementations, second data processing system 300 decrypts the double encrypted identifiers using an EG private key corresponding to the EG public key transmitted to data party computing system 10 during step 502. In various implementations, second data processing system 300 performs a merging process on the EC encrypted identifiers to determine associations between the EC encrypted identifiers. For example, second data processing system 300 may compare two EC encrypted identifiers to determine whether they represent the same underlying identifier. In various implementations, second data processing system 300 executes one or more match rules to determine associations between the EC encrypted identifiers. In various implementations, based on the determined associations, second data processing system 300 generates one or more universal measurement identifiers. For example, second data processing system 300 may generate a universal measurement identifier linking a first EC encrypted identifier and a second EC encrypted identifier. In various implementations, second data processing system 300 generates a linking graph describing associations between various identifiers (e.g., EC encrypted identifiers and the generated universal measurement identifiers, etc.).

At step 508, third data processing system 400 transmits an asymmetric encryption public key to second data processing system 300. In various implementations, the asymmetric encryption public key is an EG public key generated by third data processing system 400. Additionally or alternatively, the key may be a symmetric encryption private key. In various implementations, second data processing system 300 encrypts the generated universal measurement identifiers using the received asymmetric encryption public key to produce encrypted universal measurement identifiers.

At step 510, second data processing system 300 transmits data to first data processing system 200. For example, second data processing system 300 may transmit the EC encrypted identifiers and the encrypted universal measurement identifiers to first data processing system 200. In some implementations, second data processing system 300 transmits additional data such as context data. For example, second data processing system 300 may transmit a linking graph describing associations between the EC encrypted identifiers and the encrypted universal measurement identifiers. As another example, second data processing system 300 may transmit context data describing an origin and/or a type of each of the EC encrypted identifiers. In various implementations, first data processing system 200 decrypts the EC encrypted identifiers using an EC private key (e.g., the same EC private key used to encrypt the identifiers, etc.) to produce unencrypted identifiers. In various implementations, first data processing system 200 performs randomization operations on the received data. For example, first data processing system 200 may rerandomize (e.g., reencrypt using the same key, etc.) the received data and/or shuffle the received data (e.g., rearrange rows within a table, etc.). As a further example, first data processing system 200 may receive an EG public key from third data processing system 400 and use the received EG public key to reencrypt the encrypted universal measurement identifiers.

At step 512, first data processing system 200 transmits data to data party computing system 10. In various implementations, the data is at least partially encrypted. For example, the data may include the unencrypted identifiers and the encrypted universal measurement identifiers. In some implementations, the data includes the linking graph generated by second data processing system 300. In various implementations, first data processing system 200 transmits data to a number of external sources (e.g., a number of data party computing systems 10, etc.). For example, first data processing system 200 may transmit unencrypted identifiers to each of the external sources that provided the identifiers as well as the encrypted universal measurement identifiers.

At step 514, data party computing system 10 transmits data to third data processing system 400. In various implementations, the data includes the encrypted universal measurement identifiers. In some implementations, the data includes interaction data and/or other identifiers. Additionally or alternatively, the data may include at least a portion of the linking graph (or a derivative thereof) generated by second data processing system 300. Third data processing system 400 may unencrypt the encrypted universal measurement identifiers (e.g., using an asymmetric encryption private key corresponding to the asymmetric encryption public key, etc.) to produce unencrypted universal measurement identifiers. Third data processing system 400 may analyze the data to generate output data. For example, third data processing system 400 may analyze interaction data using the unencrypted universal measurement identifiers to determine aggregate statistics associated with online interactions. In some implementations, the output data includes data describing reach, frequency, sales lift, MTA, and/or other metrics.

At step 516, third data processing system 400 transmits data to data party computing system 10. In various implementations, the data includes aggregate statistics associated with online interactions.

Referring now to FIGS. 3A-3B, method 600 for securely generating universal measurement identifiers is shown, according to an illustrative implementation. In various implementations, system 100 performs method 600. At step 602, elements of system 100 perform a key generation and sharing process. For example, second data processing system 300 may generate an EG public key and an EG private key and share the EG public key with one or more external systems (e.g., data party computing system 10, etc.), first data processing system 200 may generate an EC private key, and third data processing system 400 may generate an EG public key and an EG private key and share the EG public key with second data processing system 300. In various implementations, the key generation process (or elements thereof) occurs continuously. For example, system 100 may perform the key generation process for each new set of data processed. In some implementations, the key generation process occurs periodically. For example, system 100 may perform the key generation process every hour, day, week, and/or the like.

At step 604, data party computing system 10 encrypts identifiers using a first public key to produce singly encrypted identifiers. In various implementations, the identifiers are associated with devices and/or contact information. For example, the identifiers may include an account identifier, a device identifier, an email, a password, and/or the like. In some implementations, step 604 includes encrypting context data associated with the identifiers. For example, step 604 may include encrypting data describing a source of the identifiers. In some implementations, the identifiers include randomized identifiers. For example, data party computing system 10 may generate a random identifier associated with an existing identifier, retain a mapping of the generated random identifier to the existing identifier, and encrypt the generated random identifier. In various implementations, the public key is a public key generated for an EG encryption scheme (e.g., a joint key EG encryption variant, etc.).

At step 606, data party computing system 10 transmits singly encrypted identifiers to first data processing system 200. In various implementations, step 606 includes transmitting context data (e.g., metadata, etc.). For example, step 606 may include transmitting unencrypted data describing a type of the encrypted identifiers. In various implementations, step 606 includes transmitting data describing associations and/or connections between the singly encrypted identifiers. For example, data party computing system 10 may transmit an encrypted linking graph describing a connection between a first singly encrypted identifier and a second singly encrypted identifier. In some implementations, step 606 includes transmitting the singly encrypted identifiers to a number of first data processing systems 200 (e.g., in a distributed architecture, in a system using multiple "blinder" parties, etc.).

At step 608, first data processing system 200 receives the singly encrypted identifiers. In various implementations, step 608 includes receiving other data (e.g., context data, etc.) from data party computing system 10. At step 610, first data processing system 200 encrypts the singly encrypted identifiers using a second secret key to produce doubly encrypted identifiers. In various implementations, the second secret key is an EC secret key generated for an EC encryption scheme (e.g., a Pohlig-Hellman cipher scheme, etc.). However, it should be understood that other encryption scheme is possible, such as an encryption scheme using any group where the Decisional Diffie Hellman (DDH) problem is presumed to be computationally intractable. In some implementations, step 610 includes shuffling the received and/or encrypted data. For example, first data processing system 200 may receive data in step 608, encrypt the data in step 610, and then shuffle the encrypted data.

At step 612, first data processing system 200 transmits the doubly encrypted identifiers to second data processing system 300. In various implementations, step 612 includes transmitting other data such as context data. At step 614, second data processing system 300 receives the doubly encrypted identifiers. In various implementations, step 614 includes receiving other data such as context data. At step 616, second data processing system 300 decrypts the doubly encrypted identifiers using a first secret key to produce partially encrypted identifiers. In various implementations, the first secret key is a secret key generated for an EG encrypted scheme.

At step 618, second data processing system 300 performs a merge using the partially encrypted identifiers to produce a merged dataset. In various implementations, the merge includes determining associations between various partially encrypted identifiers. For example, the merged dataset may describe an association between a first partially encrypted identifier and a second partially encrypted identifier. In some implementations, the merged dataset includes a linking graph. In various implementations, step 618 includes performing the merge using one or more match rules. In some implementations, second data processing system 300 scores associations between the various partially encrypted identifiers using the one or more match rules. For example, second data processing system 300 may generate a score describing a strength of an association between a first partially encrypted identifier and a second partially encrypted identifier. In various implementations, second data processing system 300 scores the associations based on a quality of the data and/or the data source. For example, second data processing system 300 may assign a medium score to an association between a first partially encrypted identifier from an untrustworthy source and a second partially encrypted identifier from a trustworthy source and may assign a high score to an association between third and fourth partially encrypted identifiers from trustworthy sources. In various implementations, second data processing system 300 generates scores using the match rules based on context data associated with the partially encrypted identifiers.

In some implementations, step 618 is iteratively performed to compare a number and/or a quality of associations generated based on different match rules. For example, a first set of match rules may result in three strong associations and a second set of match rules may result in ten weak associations and second data processing system 300 may select between the two sets of associations. In some implementations, system 100 injects test data to analyze a performance of match rules. For example, system 100 may inject ground truth data (e.g., having known associations), may measure a quality of resulting associations generated by second data processing system 300, and may update the match rules to generate improved associations. In various implementations, system 100 learns and improves the match rules and/or the quality of determined associations over time.

At step 620, second data processing system 300 generates universal identifiers and a linking graph using the merged dataset. In various implementations, the universal identifiers are associated with the partially encrypted identifiers. In some implementations, the linking graph describes associations between the universal identifiers and/or the partially encrypted identifiers. For example, the linking graph may indicate that a first universal identifier is associated with a number of partially encrypted identifiers. Linking graphs are described in greater detail with reference to FIG. 4 below. In various implementations, second data processing system 300 transmits metadata to external systems to facilitate iterative improvement of the match rules. For example, second data processing system 300 may transmit data describing matches based on identifier type, joint distributions, a number of transitive connections, histograms illustrating a number of associations, and/or the like.

At step 622, second data processing system 300 encrypts the universal identifiers using a second public key to produce encrypted universal identifiers. In various implementations, the second public key is a public key generated for an EG encryption scheme. In various implementations, the second public key is received from third data processing system 400.

At step 624, second data processing system 300 transmits the linking graph to first data processing system 200. In various implementations, the linking graph includes the encrypted universal identifiers. Additionally or alternatively, step 624 may include transmitting the encrypted universal identifiers to first data processing system 200. At step 626, first data processing system 200 receives the linking graph. In various implementations, the linking graph describes associations between the encrypted universal identifiers and/or the partially encrypted identifiers. At step 628, first data processing system 200 decrypts the partially encrypted identifiers using a second secret key to produce unencrypted identifiers. In various implementations, the second secret key is a private key generated for an EC encryption scheme.

At step 630, first data processing system 200 performs randomization operations. In various implementations, the randomization operations include shuffling rows of the linking graph (e.g., the linking graph may be represented by a table and rows of the table may be shuffled, etc.). Additionally or alternatively, the randomization operations may include rehashing and/or reencrypting data. For example, the encrypted universal identifiers may be reencrypted using the second public key to generate new hashes for the encrypted universal identifiers.

At step 632, first data processing system 200 transmits the linking graph to data party processing system 10. In various implementations, step 632 includes transmitting other data such as context data and/or the unencrypted identifiers. In various implementations, step 632 includes transmitting data to a number of data party processing systems 10 (e.g., each of data party processing systems 10 that provided identifiers, etc.).

At step 634, data party processing system 10 receives the linking graph. In various implementations, the linking graph includes a number of encrypted universal identifiers. For example, the linking graph may describe associations between a number of encrypted universal identifiers and one or more other identifiers. At step 636, data party processing system 10 generates analysis results using third data processing system 400 and the linking graph. For example, data party processing system 10 may transmit the linking graph and interaction data to third data processing system 400 which may unencrypt universal identifiers within the linking graph and generate aggregate interaction measurements (e.g., reach, frequency, etc.).

Figure 4:
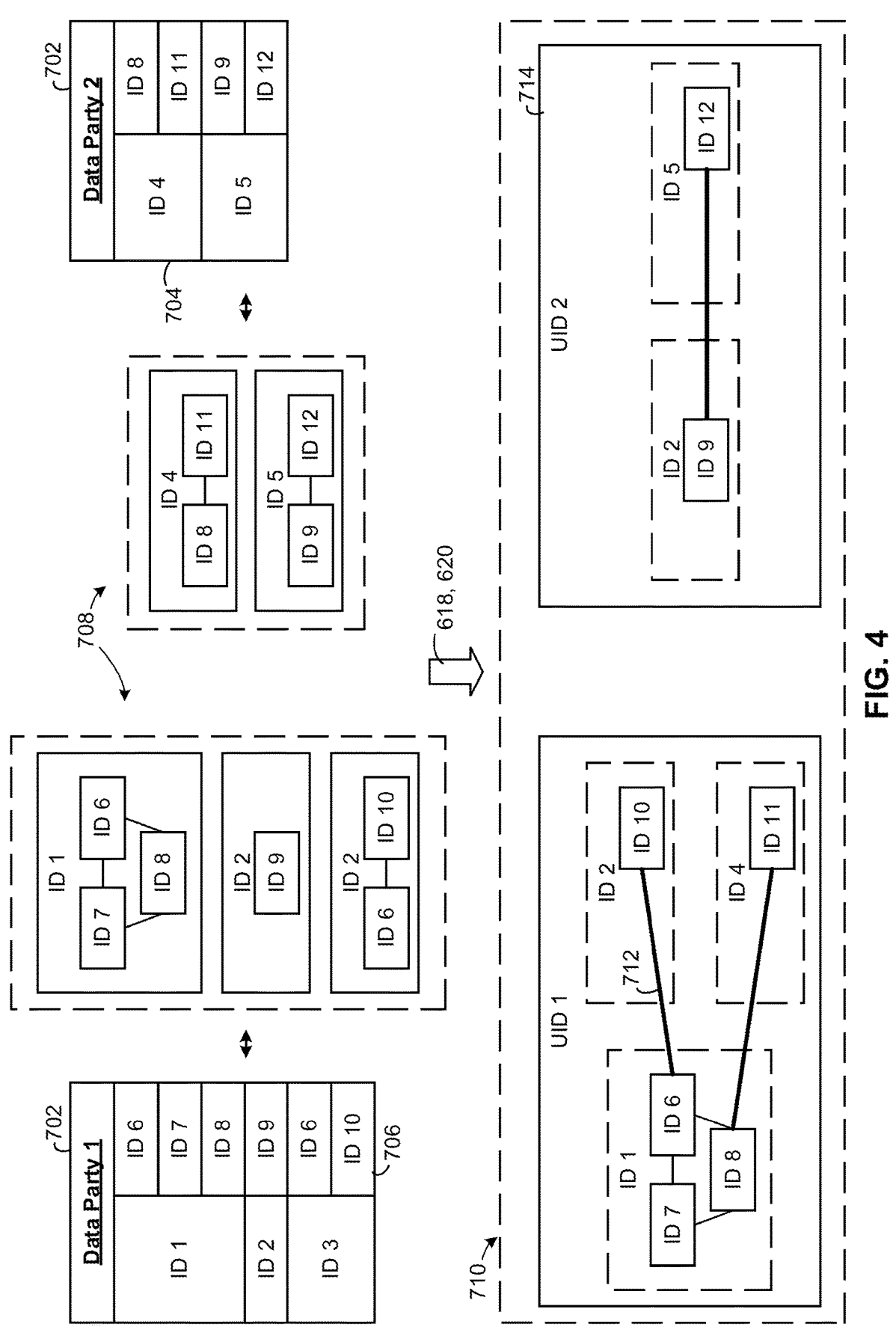
FIG. 4 is a diagram illustration data set manipulation according to the method of FIGS. 3A-3B, according to an illustrative implementation.

Referring now to FIG. 4, data set manipulation is shown, according to an illustrative implementation. In various implementations, system 100 receives data from various data party computing systems 10 including various identifiers, determines associations between the various identifiers (e.g., merges the identifiers, etc.), and generates universal measurement identifiers based on the determined associations. For example, system 100 may receive a first set of identifiers having a first identifier from a first data party and a second set of identifiers having a second identifier from a second data party, may determine an association between the first identifier and the second identifier, and may generate a universal measurement identifier linking the first identifier and the second identifier.

In various implementations, system 100 receives tables 702 from one or more data party computing systems 10. Tables 702 may describe one or more identifiers and associations between the identifiers. For example, tables 702 may be reformatted as graphs 708 illustrating associations between first identifiers 704 and second identifiers 706. Speaking generally, system 100 may merge first identifiers 704 and second identifiers 706 in tables 702 (e.g., during step 618, etc.) to generate linking graph 710 describing associations 712 between the identifiers (e.g., "ID 6" is associated with "ID 10," etc.). In various implementations, an analysis system (e.g., third data processing system 400, etc.) may use linking graph 710 to generate aggregate statistics associated with device interactions across various platforms. In various implementations, system 100 assigns (e.g., during step 620, etc.) universal identifiers 714 to first identifiers 704 and second identifiers 706. Therefore, data party computing system 10 may learn of associations 712 that were previously unknown (e.g., "ID 6" is associated with "ID 10," etc.). In various implementations, system 100 transmits linking graph 710 describing associations between universal identifiers and various other identifiers to data party computing system 10.

Figure 5:
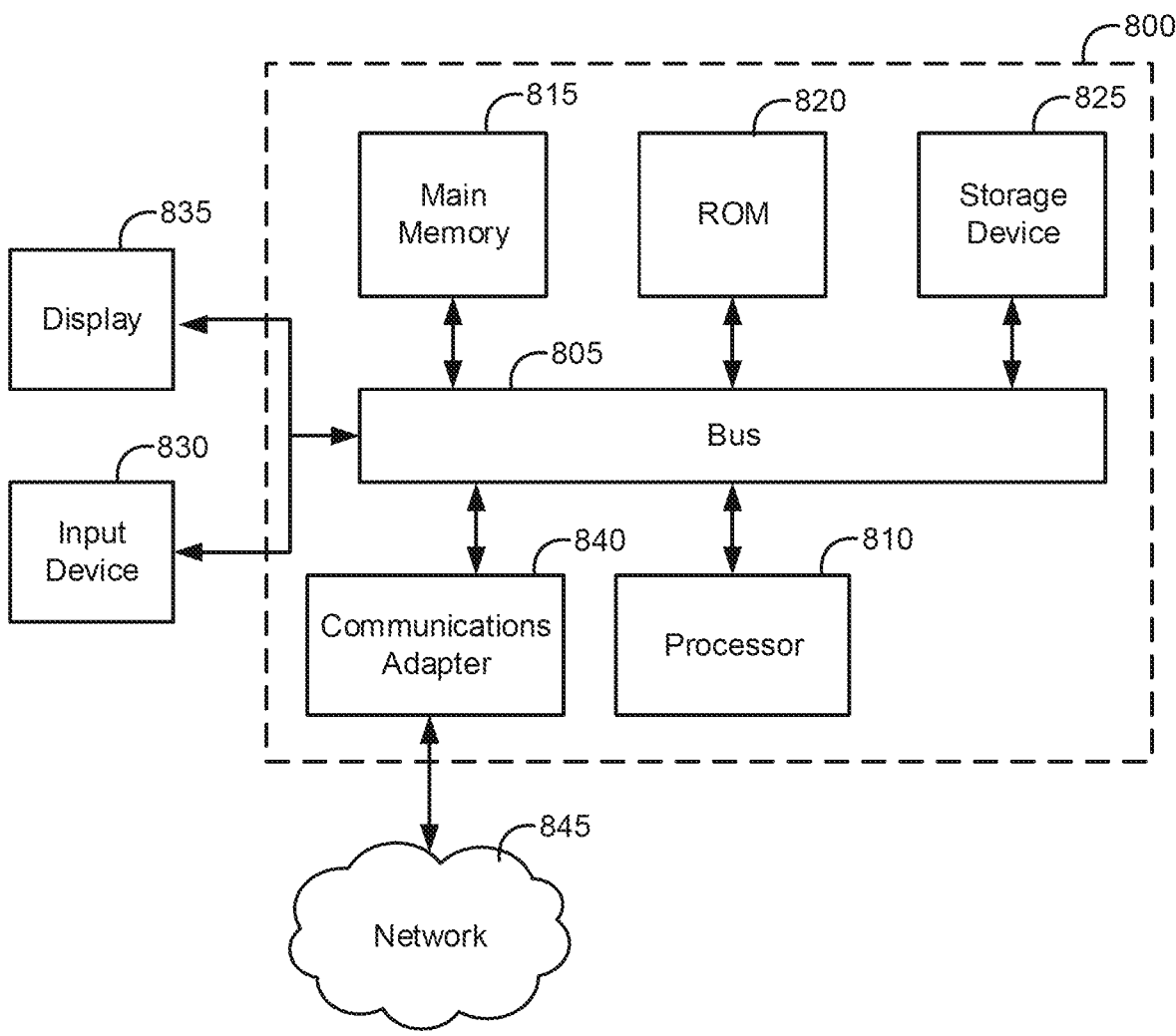
FIG. 5 is a block diagram of a computing system, according to an illustrative implementation.

FIG. 5 illustrates a depiction of a computing system 800 that can be used, for example, to implement any of the illustrative systems (e.g., system 100, etc.) described in the present disclosure. The computing system 800 includes a bus 805 or other communication component for communicating information and a processor 810 coupled to the bus 805 for processing information. The computing system 800 also includes main memory 815, such as a random access memory ("RAM") or other dynamic storage device, coupled to the bus 805 for storing information, and instructions to be executed by the processor 810. Main memory 815 can also be used for storing position information, temporary variables, or other intermediate information during execution of instructions by the processor 810. The computing system 800 may further include a read only memory ("ROM") 820 or other static storage device coupled to the bus 805 for storing static information and instructions for the processor 810. A storage device 825, such as a solid state device, magnetic disk or optical disk, is coupled to the bus 805 for persistently storing information and instructions.

The computing system 800 may be coupled via the bus 805 to a display 835, such as a liquid crystal display, or active matrix display, for displaying information to a user. An input device 830, such as a keyboard including alphanumeric and other keys, may be coupled to the bus 805 for communicating information, and command selections to the processor 810. In another implementation, the input device 830 has a touch screen display 835. The input device 830 can include a cursor control, such as a mouse, a trackball, or cursor direction keys, for communicating direction information and command selections to the processor 810 and for controlling cursor movement on the display 835.

In some implementations, the computing system 800 may include a communications adapter 840, such as a networking adapter. Communications adapter 840 may be coupled to bus 805 and may be configured to enable communications with a computing or communications network 845 and/or other computing systems. In various illustrative implementations, any type of networking configuration may be achieved using communications adapter 840, such as wired (e.g., via Ethernet), wireless (e.g., via Wi-Fi, Bluetooth, etc.), pre-configured, ad-hoc, LAN, WAN, etc.

According to various implementations, the processes that effectuate illustrative implementations that are described herein can be achieved by the computing system 800 in response to the processor 810 executing an arrangement of instructions contained in main memory 815. Such instructions can be read into main memory 815 from another computer-readable medium, such as the storage device 825. Execution of the arrangement of instructions contained in main memory 815 causes the computing system 800 to perform the illustrative processes described herein. One or more processors in a multi-processing arrangement may also be employed to execute the instructions contained in main memory 815. In alternative implementations, hard-wired circuitry may be used in place of or in combination with software instructions to implement illustrative implementations. Thus, implementations are not limited to any specific combination of hardware circuitry and software.

Although an example processing system has been described in FIG. 5, implementations of the subject matter and the functional operations described in this specification can be carried out using other types of digital electronic circuitry, or in computer software, firmware, or hardware, including the structures disclosed in this specification and their structural equivalents, or in combinations of one or more of them.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user. In situations in which the systems described herein collect personal information about users or applications installed on a user device, or make use of personal information, the users are provided with an opportunity to control whether programs or features collect user information (e.g., information about a user's social network, social actions, or activities, profession, a user's preferences, or a user's current location). In addition or in the alternative, certain data may be treated in one or more ways before it is stored or used, so that personal information is removed.

Implementations of the subject matter and the operations described in this specification can be carried out using digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer-readable storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be implemented as operations performed by a data processing apparatus on data stored on one or more computer-readable storage devices or received from other sources.

The term "data processing apparatus" or "computing device" encompasses all kinds of apparatus, devices, and machines for processing data, including by way of example, a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit). Circuit as utilized herein, may be implemented using hardware circuitry (e.g., FPGAs, ASICs, etc.), software (instructions stored on one or more computer readable storage media and executable by one or more processors), or any combination thereof.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant ("PDA"), a mobile audio or video player, a game console, a Global Positioning System ("GPS") receiver, or a portable storage device (e.g., a universal serial bus ("USB") flash drive), to name just a few. Devices suitable for storing computer program instructions and data include all forms of non-volatile memory, media and memory devices, including by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be carried out using a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be carried out using a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be carried out in combination or in a single implementation. Conversely, various features that are described in the context of a single implementation can also be carried out in multiple implementations, separately, or in any suitable subcombination. Moreover, although features may be described above as acting in certain combinations and even initially claimed as such, one or more features from a claimed combination can, in some cases, be excised from the combination, and the claimed combination may be directed to a subcombination or variation of a subcombination. Additionally, features described with respect to particular headings may be utilized with respect to and/or in combination with illustrative implementations described under other headings; headings, where provided, are included solely for the purpose of readability and should not be construed as limiting any features provided with respect to such headings.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products embodied on tangible media.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

22

What is claimed is:

1. A method, comprising:
receiving, at a first computing system, encrypted identifiers;
performing, by the first computing system, a concealing operation on the encrypted identifiers to produce concealed encrypted identifiers, wherein the concealing operation:
conceals the encrypted identifiers from the first computing system and a second computing system;
deterministically encrypting the encrypted identifiers with second encryption to produce the concealed encrypted identifiers; and
enables matching between the concealed encrypted identifiers;
decrypting, by the second computing system, the concealed encrypted identifiers to produce concealed identifiers;
analyzing, by the second computing system using one or more match rules, the concealed identifiers to generate one or more associations between the concealed identifiers, wherein the one or more match rules is based on a linking graph describing associations between a plurality of disparate identifiers; and
generating, by the second computing system, one or more universal identifiers based on the one or more associations.

2. The method of claim 1, wherein the concealing operation includes shuffling the encrypted identifiers.

3. The method of claim 1, wherein analyzing the concealed identifiers includes:
matching one or more of the concealed identifiers to generate the one or more associations;
scoring the one or more associations using the one or more match rules; and
pruning the one or more associations based on the scoring.

4. The method of claim 3, wherein scoring the one or more associations includes:
determining a source of the one or more concealed identifiers associated with the one or more associations;
performing a lookup of the one or more match rules using the source; and
assigning a score to the one or more associations based on the lookup.

5. The method of claim 1, further comprising:
analyzing, by the second computing system using one or more different match rules, the concealed identifiers to generate a second set of one or more associations; and
selecting, by the second computing system, between the one or more associations generated using the one or more different match rules and the one or more associations generated using the one or more match rules.

6. The method of claim 1, further comprising:
determining a quality of the one or more associations; and
iteratively adjusting the one or more match rules based on the determined quality.

7. The method of claim 1, further comprising:
analyzing, by the second computing system using the one or more match rules, identifiers having known associations to generate one or more test associations;
comparing the known associations to the one or more test associations; and
updating the one or more match rules based on the comparison.

8. The method of claim 1, wherein at least one of the first computing system or the second computing system is a distributed computing system.

9. The method of claim 1, the method further comprising:
updating the one or more match rules based on a quality measurement of the one or more universal identifiers.

10. The method of claim 1, wherein the linking graph includes associations between encrypted identifiers and universal identifiers.

11. A system for constructing a universal identifier, comprising:

a first computing system configured to:

receive encrypted identifiers; and perform a concealing operation on the encrypted identifiers to produce concealed encrypted identifiers, wherein the concealing operation;

conceals the encrypted identifiers from the first computing system and a second computing system;

deterministically encrypting the encrypted identifiers with second encryption to produce the concealed encrypted identifiers; and enables matching between the concealed encrypted identifiers; and the second computing system configured to:

decrypt the concealed encrypted identifiers to produce concealed identifiers;

analyze, using one or more match rules, the concealed identifiers to generate one or more associations between the concealed identifiers, wherein the one or more match rules is based on a linking graph describing associations between a plurality of disparate identifiers; and generate one or more universal identifiers based on the one or more associations.

12. The system of claim 11, wherein the concealing operation includes shuffling the encrypted identifiers.

13. The system of claim 11, wherein analyzing the concealed identifiers includes:

matching one or more of the concealed identifiers to generate the one or more associations;

scoring the one or more associations using the one or more match rules; and pruning the one or more associations based on the scoring.

14. The system of claim 13, wherein scoring the one or more associations includes:

determining a source of the one or more concealed identifiers associated with the one or more associations;

performing a lookup of the one or more match rules using the source; and assigning a score to the one or more associations based on the lookup.

15. The system of claim 11, wherein the second computing system is further configured to:

analyze, using one or more different match rules, the concealed identifiers to generate a second set of one or more associations; and select between the one or more associations generated using the one or more different match rules and the one or more associations generated using the one or more match rules.

16. The system of claim 11, wherein the second computing system is further configured to:

determine a quality of the one or more associations; and iteratively adjust the one or more match rules based on the determined quality.

17. The system of claim 11, wherein the second computing system is further configured to:

analyze, using the one or more match rules, identifiers having known associations to generate one or more test associations;

compare the known associations to the one or more test associations; and update the one or more match rules based on the comparison.

18. The system of claim 11, wherein at least one of the first computing system or the second computing system is a distributed computing system.

19. One or more non-transitory computer-readable storage media having instructions stored thereon that, when executed by the one or more processors, cause the one or more processors to:

receive, from a first computing system, concealed encrypted identifiers having encrypted identifiers that are concealed from the first computing system and the one or more processors but enable matching between the concealed encrypted identifiers, wherein the concealed encrypted identifiers are produced by deterministically encrypting the encrypted identifiers with second encryption;

decrypt the concealed encrypted identifiers to produce concealed identifiers;

analyze, using one or more match rules, the concealed identifiers to generate one or more associations between the concealed identifiers, wherein the one or more match rules is based on a linking graph describing associations between a plurality of disparate identifiers; and generate one or more universal identifiers based on the one or more associations.

20. The one or more non-transitory computer-readable storage media of claim 19, wherein analyzing the concealed identifiers includes:

matching one or more of the concealed identifiers to generate the one or more associations;

scoring the one or more associations using the one or more match rules; and pruning the one or more associations based on the scoring.

* * * * *